United States Patent
Yosifov et al.

(10) Patent No.: US 11,295,511 B1
(45) Date of Patent: Apr. 5, 2022

(54) MULTI-USER DATA PRESENTATION IN AR/VR

(71) Applicant: Progress Software Corporation, Bedford, MA (US)

(72) Inventors: Deyan Petrov Yosifov, Sofia (BG); Panayot Conev Cankov, Sofia (BG)

(73) Assignee: Progress Software Corporation, Bedford, MA (US)

( * ) Notice: Subject to any disclaimer, the term of this patent is extended or adjusted under 35 U.S.C. 154(b) by 0 days.

(21) Appl. No.: 17/171,424

(22) Filed: Feb. 9, 2021

Related U.S. Application Data

(60) Provisional application No. 62/975,173, filed on Feb. 11, 2020.

(51) Int. Cl.
*G06T 15/20* (2011.01)
*G06T 19/20* (2011.01)
*G06T 11/20* (2006.01)
*G06F 3/0481* (2013.01)
*G06F 3/04815* (2022.01)

(52) U.S. Cl.
CPC .......... *G06T 15/20* (2013.01); *G06F 3/04815* (2013.01); *G06T 11/206* (2013.01); *G06T 19/20* (2013.01); *G06T 2200/24* (2013.01); *G06T 2219/024* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 8,255,791 B2 * | 8/2012 | Koren | G06F 3/0484 715/227 |
| 9,047,698 B2 * | 6/2015 | Maciocci | G06F 3/167 |

(Continued)

*Primary Examiner* — Jason A Pringle-Parker
(74) *Attorney, Agent, or Firm* — Patent Law Works

(57) ABSTRACT

A system and method for generating a multi-user presentation including receiving a graphic, anchoring a first instance of the graphic in a collaboration environment with a first position, first scale, and first orientation relative to an initial position of a presenting user in the collaboration environment; applying a first anchor transform to a second instance of the graphic, the first anchor transform anchoring the second instance of the graphic in the collaboration environment with the first position, the first scale, and the first orientation relative to an initial position of a first attendee in the collaboration environment; sending the first instance of the graphic for presentation to the presenter, and the second instance of the graphic for presentation to the first attendee; receiving a first presenter interaction modifying the first instance, where the modified first instance includes a first modification to one or more of the first position, the first scale, and the first orientation relative to the presenter; applying a first local transform to the first anchor transform associated with the second instance, where application of the first local transform modifies the second instance, where the modified second instance includes the first modification to one or more of the first position, the first scale, and the first orientation relative to the first attendee; and sending the modified first instance of the graphic for presentation to the presenter, and the modified second instance of the graphic for presentation to the first attendee.

16 Claims, 7 Drawing Sheets

(56) References Cited

U.S. PATENT DOCUMENTS

| | | | |
|---|---|---|---|
| 9,310,883 B2* | 4/2016 | Weising | A63F 13/50 |
| 9,595,127 B2* | 3/2017 | Champion | G06F 3/03545 |
| 9,779,548 B2* | 10/2017 | Weisman | A63F 13/795 |
| 9,883,138 B2* | 1/2018 | Chen | G06F 3/041 |
| 10,997,558 B2* | 5/2021 | Platt | G06F 3/011 |
| 2012/0249741 A1* | 10/2012 | Maciocci | G06T 15/503 |
| | | | 348/46 |

* cited by examiner

MULTI-USER DATA PRESENTATION IN AR/VR

CROSS-REFERENCE TO RELATED APPLICATIONS

This application claims priority, under 35 U.S.C. § 119, of U.S. Provisional Patent Application No. 62/975,173, filed Feb. 11, 2020 and entitled "Multi-User Data Presentation in AR/VR," the entirety of which is hereby incorporated by reference.

FIELD OF INVENTION

The present disclosure relates to multi-user presentation in augmented reality (AR) or virtual reality (VR).

BACKGROUND

It is often said that a picture is worth a thousand words, and complex data often benefits from 3-D presentation in order to be seen and analyzed. Three dimensional maquettes are expensive and slow to produce. Moreover, people need to be physically located close to the maquette to see and understand. Observing a maquette on a 2-D display is sub optimal. Using a 360-degree environment to do live 3D-streaming is an alternative approach, and benefits from having a real (not simulated) environment and live presenter (rather than an avatar). However, hardware equipment to live stream 3D-experiences to VR is quite expensive and includes of: a. High-end 360 camera or cluster of several GoPro cameras—starting from $2000 up to $33,000 and more. Additionally, the stitching, encoding and streaming software that requires powerful PC station to process multiple video streams simultaneously—software alone can cost as much as $3-5000 and hardware starts from $5000 and above. Further, Viewers may not interact with the environment—the experience is like watching a 3D movie. Additionally, the digital 3D content may not be overlaid on the experience—the presenter will still be sharing their 2D-screen and viewers will not be able to see the Graphic in real 3D. Moreover, viewers can only see the presenter and their screen but not the rest of the participants. Therefore, existing methods and systems do not allow users to present and analyze data in an immersive and socially collaborative way, regardless of physical location.

SUMMARY

This specification relates to methods and systems for generating a multi-user presentation in AR or VR. According to one aspect of the subject matter described in this disclosure, a method includes receiving, using one or more processors, a graphic, anchoring, using the one or more processors, a first instance of the graphic in a collaboration environment with a first position, first scale, and first orientation relative to an initial position of a presenting user in the collaboration environment; applying, using the one or more processors, a first anchor transform to a second instance of the graphic, the first anchor transform anchoring the second instance of the graphic in the collaboration environment with the first position, the first scale, and the first orientation relative to an initial position of a first attendee in the collaboration environment; sending, using the one or more processors, the first instance of the graphic for presentation to the presenter, and the second instance of the graphic for presentation to the first attendee; receiving, using the one or more processors, a first presenter interaction modifying the first instance, where the modified first instance includes a first modification to one or more of the first position, the first scale, and the first orientation relative to the presenter; applying, using the one or more processors, a first local transform to the first anchor transform associated with the second instance, where application of the first local transform modifies the second instance, where the modified second instance includes the first modification to one or more of the first position, the first scale, and the first orientation relative to the first attendee; and sending, using the one or more processors, the modified first instance of the graphic for presentation to the presenter, and the modified second instance of the graphic for presentation to the first attendee.

In general, another aspect of the subject matter described in this disclosure includes a system comprising one or more processors and memory operably coupled with the one or more processors, wherein the memory stores instructions that, in response to the execution of the instructions by one or more processors, cause the one or more processors to perform the operations of receive a graphic, anchor a first instance of the graphic in a collaboration environment with a first position, first scale, and first orientation relative to an initial position of a presenting user in the collaboration environment; apply a first anchor transform to a second instance of the graphic, the first anchor transform anchoring the second instance of the graphic in the collaboration environment with the first position, the first scale, and the first orientation relative to an initial position of a first attendee in the collaboration environment; send the first instance of the graphic for presentation to the presenter, and the second instance of the graphic for presentation to the first attendee; receive a first presenter interaction modifying the first instance, wherein the modified first instance includes a first modification to one or more of the first position, the first scale, and the first orientation relative to the presenter; apply a first local transform to the first anchor transform associated with the second instance, wherein application of the first local transform modifies the second instance, wherein the modified second instance includes the first modification to one or more of the first position, the first scale, and the first orientation relative to the first attendee; and send the modified first instance of the graphic for presentation to the presenter, and the modified second instance of the graphic for presentation to the first attendee.

Other implementations of one or more of these aspects include corresponding systems, apparatus, and computer programs, configured to perform the actions of the methods, encoded on computer storage devices.

These and other implementations may each optionally include one or more of the following features. For instance, the method further comprises applying the first local transform to the first anchor transform associated with the second instance includes concatenating the first local transform to the first anchor transform using matrix multiplication. The application of the second local transform modifies the second instance to include the second modification relative to the first attendee; and sending the modified first instance of the graphic for presentation to the presenter, and the modified second instance of the graphic for presentation to the first attendee. Applying the second local transform to the result of the first local transform and the first anchor transform includes concatenating the second local transform to a product of the first anchor transform and first local transform using matrix multiplication. Application of the second local transform modifies the third instance, where the modified third instance includes the first modification to one or more of the first position, the first scale, and the first orientation relative to the second attendee; and sending, using the one or more processors, the modified third instance of the graphic for presentation to the second attendee. The first presenter interaction is an interaction with the first instance of the graphic. The first presenter interaction is an interaction with the collaboration environment. The first presenter interaction is an interaction with a head mounted display. Presenter interactions include a first subset of presenter interactions responsive to which a local transform is applied to attendee instances of the graphic, and a second subset of presenter interactions ignored for purposes of local transformation application.

It should be understood that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
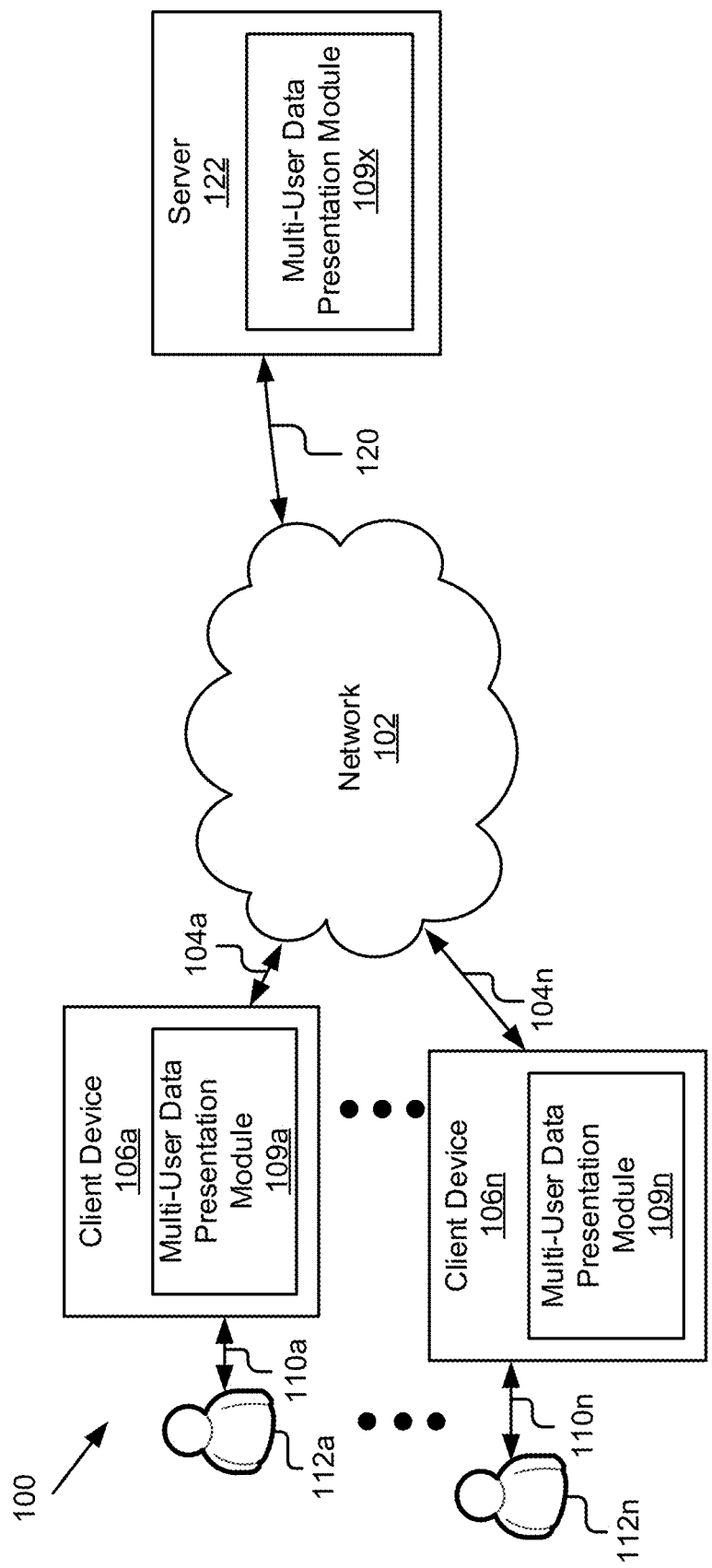
FIG. 1 is a block diagram illustrating an example system for or multi-user data presentation according to one embodiment.

FIG. 1 is a block diagram illustrating an example system 100 for multi-user data presentation according to one embodiment. The illustrated system 100 includes client devices 106*a* . . . 106*n*, and a server 122, which are communicatively coupled via a network 102 for interaction with one another. For example, the client devices 106*a* . . . 106*n* (also referred to individually and collectively as 106) may be respectively coupled to the network 102 via signal lines 104*a* . . . 104*n* and may be accessed by users 112*a* . . . 112*n* (also referred to individually and collectively as user 112) as illustrated by lines 110*a* . . . 110*n*. The server 122 may be coupled to the network 102 via signal line 120. The use of the nomenclature "a" and "n" in the reference numbers indicates that any number of those elements having that nomenclature may be included in the system 100.

The network 102 may include any number of networks and/or network types. For example, the network 102 may include, but is not limited to, one or more local area networks (LANs), wide area networks (WANs) (e.g., the Internet), virtual private networks (VPNs), mobile networks (e.g., the cellular network), wireless wide area network (WWANs), Wi-Fi networks, WiMAX® networks, Bluetooth® communication networks, peer-to-peer networks, other interconnected data paths across which multiple devices may communicate, various combinations thereof, etc. Data transmitted by the network 102 may include packetized data (e.g., Internet Protocol (IP) data packets) that is routed to designated computing devices coupled to the network 102. In some implementations, the network 102 may include a combination of wired and wireless (e.g., terrestrial or satellite-based transceivers) networking software and/or hardware that interconnects the computing devices of the system 100. For example, the network 102 may include packet-switching devices that route the data packets to the various computing devices based on information included in a header of the data packets.

The data exchanged over the network 102 can be represented using technologies and/or formats including the hypertext markup language (HTML), the extensible markup language (XML), JavaScript Object Notation (JSON), Comma Separated Values (CSV), etc. In addition, all or some of links can be encrypted using encryption technologies, for example, the secure sockets layer (SSL), Secure HTTP (HTTPS) and/or virtual private networks (VPNs) or Internet Protocol security (IPsec). In another embodiment, the entities can use custom and/or dedicated data communications technologies instead of, or in addition to, the ones described above. Depending upon the embodiment, the network 102 can also include links to other networks.

The client devices 106 are computing devices having data processing and communication capabilities. While FIG. 1 illustrates two client devices 106, the present specification applies to any system architecture having one or more client devices 106. In some embodiments, a client device 106 may include a processor (e.g., virtual, physical, etc.), a memory, a power source, a network interface, and may include other components whether software or hardware, such as a display (e.g. a stereoscopic display), graphics processor, wireless transceivers, keyboard, camera, sensors, firmware, operating systems, drivers, various physical connection interfaces (e.g., USB, HDMI, etc.). The client devices 106*a* . . . 106*n* may couple to and communicate with one another and the other entities of the system 100 via the network 102 using a wireless and/or wired connection.

Examples of client devices 106 may include, but are not limited to, AR or VR devices, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. In some embodiments, the client devices may be AR or VR devices. Examples of AR/VR devices include, but are not limited to Oculus GO, Google Cardboard, Google Daydream View, HTC Vive, Merge VR Headset, Lenovo IDEA, Zeiss VR One, VR HMD, etc. While two or more client devices 106 are depicted in FIG. 1, the system 100 may include any number of client devices 106. In addition, the client devices 106*a* . . . 106*n* may be the same or different type of computing devices.

The server 122 may include one or more computing devices having data processing, storing, and communication capabilities. For example, the server 122 may include one or more hardware servers, server arrays, storage devices, systems, etc., and/or may be centralized or distributed/cloudbased. In some implementations, the server 122 may include one or more virtual servers, which operate in a host server environment and access the physical hardware of the host server including, for example, a processor, memory, storage, network interfaces, etc., via an abstraction layer (e.g., a virtual machine manager).

In the illustrated embodiment, the client devices 106a-n include instances of the multi-user data presentation module 109a-n, and the server 122 includes an instance of the multi-user data presentation module 109x. In some embodiments, the server-side instance 109 may handle synchronization of the graphic viewed by the various users 112 on the various client devices 106, voice, people connections, and interactions, and the client-side instances 109a-n may handle presentation of the graphic and communicate a user's (e.g. a presenter's) interactions with the graphic to the server 122 for synchronization to other users' (e.g. attendees') client devices 106a-n.

However, it should be understood that the system 100 illustrated in FIG. 1 is representative of an example system for multi-user data presentation according to one embodiment and that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the system 100 may be integrated into to a single computing device or system or additional computing devices or systems, etc.

Figure 2:
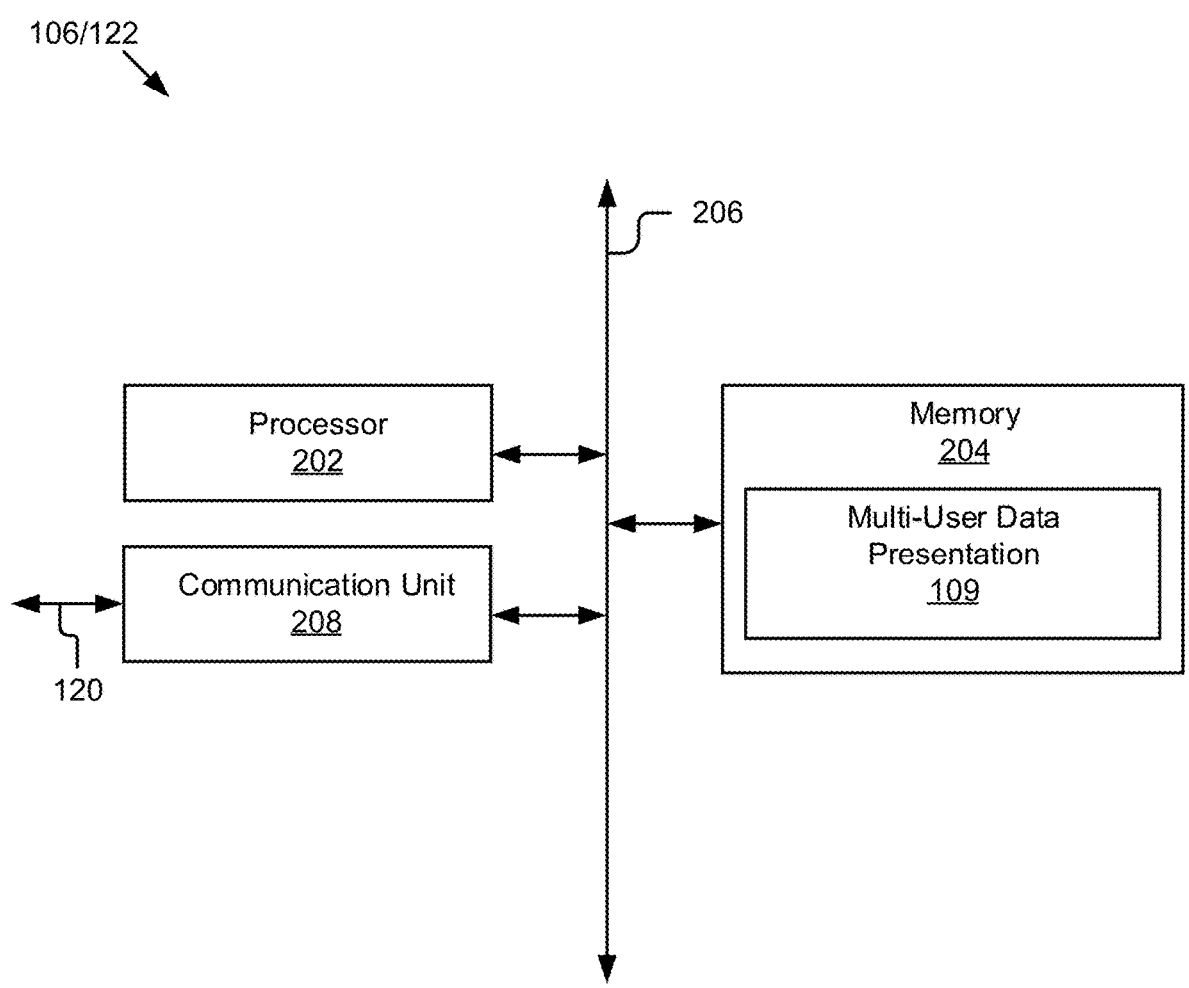
FIG. 2 is a block diagram illustrating an example computing device according to one embodiment.

FIG. 2 is a block diagram of an example computing device 106/122 according to one embodiment. The computing device 106/122, as illustrated, may include a processor 202, a memory 204 and a communication unit 208, which may be communicatively coupled by a communications bus 206. The computing device 106/122 depicted in FIG. 2 is provided by way of example and it should be understood that it may take other forms and include additional or fewer components without departing from the scope of the present disclosure. For example, while not shown, the computing device 106/122 may include a storage device, input and output devices (e.g., a display, a keyboard, a mouse, touch screen, speakers, etc.), various operating systems, sensors, additional processors, and other physical configurations. Additionally, it should be understood that the computer architecture depicted in FIG. 2 and described herein may be applied to multiple entities in a system 100, for example, the computing device 106/122 may be a client device 106 or a server 122, and those entities may have different architecture (e.g. the server 122 may not have a display, but a client device 106 may in one embodiment).

The processor 202 may execute code, routines and software instructions by performing various input/output, logical, and/or mathematical operations. The processor 202 have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single core or plurality of processing units and/or cores. In some implementations, the processor 202 may be capable of generating and providing electronic display signals to a display device (not shown), supporting the display of images, etc. In some implementations, the processor 202 may be coupled to the memory 204 via the bus 206 to access data and instructions therefrom and store data therein. The bus 206 may couple the processor 202 to the other components of the computing device 106/122 including, for example, the memory 204 and communication unit 208.

The memory 204 may store and provide access to data to the other components of the computing device 106/122. In some implementations, the memory 204 may store instructions and/or data that may be executed by the processor 202. For example, in the illustrated embodiment, the memory 204 may store the multi-user data presentation module 109. The memory 204 is also capable of storing other instructions and data, including, for example, an operating system, hardware drivers, other software applications, databases, etc. The memory 204 may be coupled to the bus 206 for communication with the processor 202 and the other components of the computing device 106/122.

The memory 204 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 202. In some implementations, the memory 204 may include one or more of volatile memory and non-volatile memory. For example, the memory 204 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory 204 may be a single device or may include multiple types of devices and configurations.

The bus 206 can include a communication bus for transferring data between components of a computing device 106/122 and/or between computing devices (e.g. between one or more of the client devices 106 and server 122), a network bus system including the network 102 or portions thereof, a processor mesh, a combination thereof, etc. In some implementations, the multi-user data presentation modules 109, its sub-components, and various other software operating on the computing device 106/122 (e.g., an operating system, etc.) may cooperate and communicate via a software communication mechanism implemented in association with the bus 206. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 208 may include one or more interface devices (I/F) for wired and/or wireless connectivity with the network 102. For instance, the communication unit 208 may include, but is not limited to, CAT-type interfaces; wireless transceivers for sending and receiving signals using radio transceivers (4G, 3G, 2G, etc.) for communication with the mobile network, and radio transceivers for and close-proximity (e.g., Bluetooth®, NFC, etc.) connectivity, etc.; USB interfaces; various combinations thereof; etc. In some implementations, the communication unit 208 can link the processor 202 to the network 102, which may in turn be coupled to other processing systems. The communication unit 208 can provide other connections to the network 102 and to other entities of the system 100 using various standard network communication protocols.

As mentioned above, the computing device 106/122 may include other and/or fewer components. Examples of other components may include a display, an input device, a sensor, etc. (not shown). In one embodiment, the computing device 106/122 includes a display. The display may display electronic images and data for presentation to a user 112. The display may include any display device, monitor or screen, including, for example, an organic light-emitting diode (OLED) display, a liquid crystal display (LCD), etc. In some implementations, the display may be a touch-screen display capable of receiving input from a stylus, one or more fingers of a user 112, etc. For example, the display may be a capacitive touch-screen display capable of detecting and interpreting multiple points of contact with the display surface. In some embodiments the display may be stereoscopic. For example, the display is a stereoscopic display in a VR headset.

The input device (not shown) may include any device for inputting information into the computing device 106/122. In some implementations, the input device may include one or more peripheral devices. For example, the input device may include a keyboard (e.g., a QWERTY keyboard or keyboard in any other language), a pointing device (e.g., a mouse or touchpad), microphone, an image/video capture device (e.g., camera), etc. In some implementations, the input device may include a touch-screen display capable of receiving input from the one or more fingers of the user 112. For example, the user 112 could interact with an emulated (i.e., virtual or soft) keyboard displayed on the touch-screen display by using fingers to contacting the display in the keyboard regions. In some embodiments, the input device may include VR hand controls which may include, by way of example and not limitation, one or more of a trigger, joystick, button, touchpad, gyroscope, gimbal, etc.

Example Multi-User Data Presentation Module 109

Figure 3:
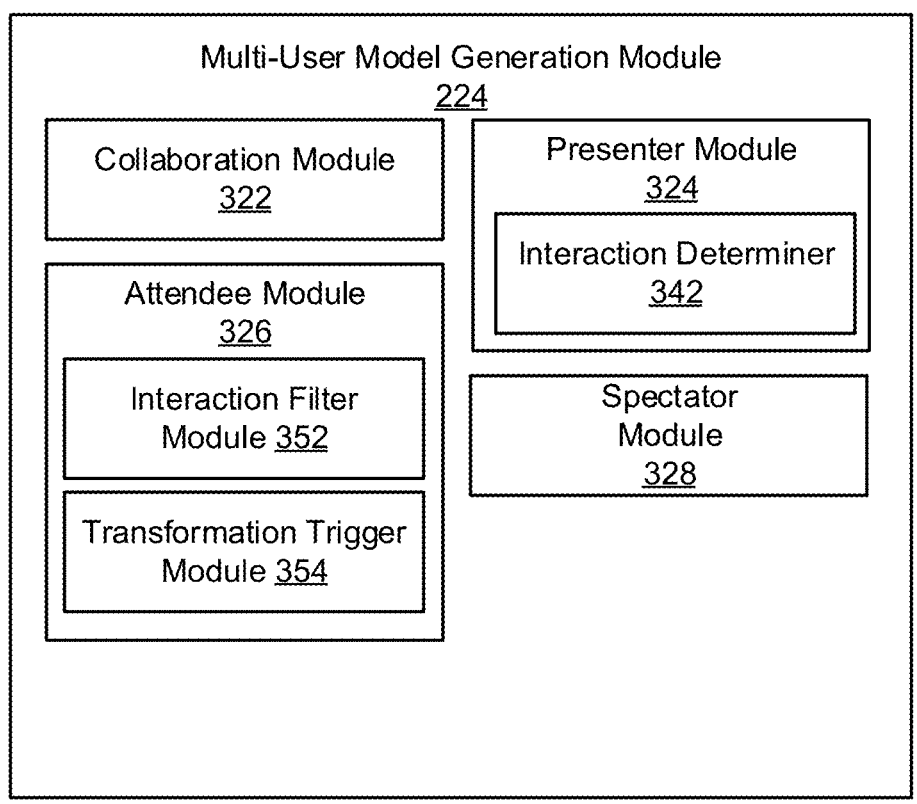
FIG. 3 is a block diagram of a multi-user data presentation module according to one embodiment.

Referring now to FIG. 3, the multi-user data presentation module 109 is shown in more detail according to one embodiment. FIG. 3 is a block diagram of the multi-user data presentation module 109 included in a computing device 106/122 according to one embodiment.

The multi-user data presentation module 109 generates and maintains presentation of data to multiple users. In one embodiment, the multiple users are one of two types of user—presenter and attendee. In one such embodiment, there is a single presenter and one or more attendees.

Figure 4:
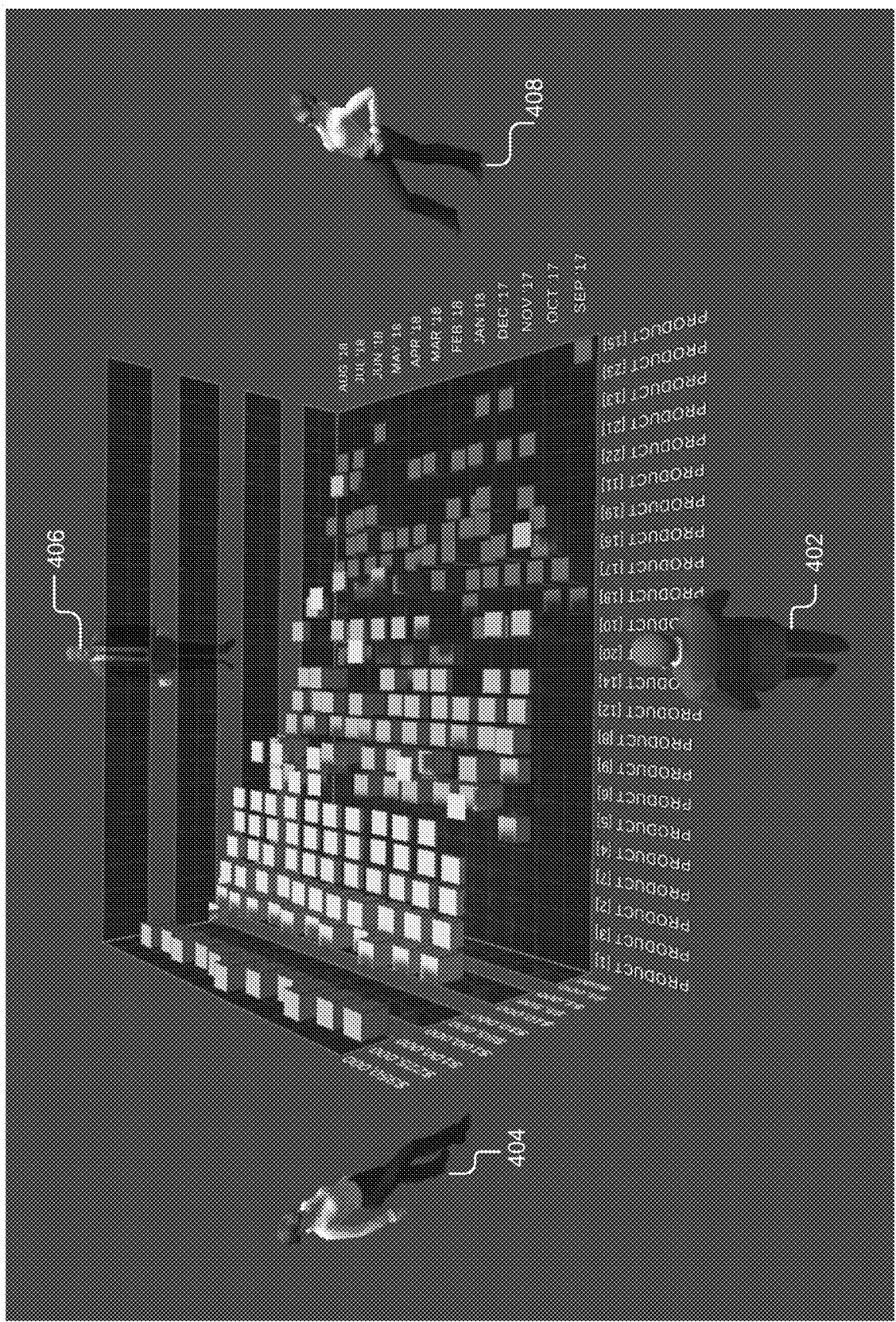
FIG. 4 illustrates a common graphic from different angles.

To understand and analyze complex data, it is often beneficial to view the data in three dimensions. However, analysis of such 3-D data is contextual and that context can vary based on a user's viewing angle. When looking at the same graphic, users of existing systems have different viewpoints, hence observing different part of the 3D scene. This can present problems for building a collective understanding of what is being presented, e.g., 3D data graphic, model, etc. Referring now to FIG. 4, an example graphic and four user avatars 402, 404, 406, 408 are illustrated. Assuming user avatar 402 is the presenter, it should be understood and appreciated that users 404 and 406 would have difficulty seeing what information user 402 is referring to, as it is obscured by the vertical axis shading, other data, or both. User 408 may not be able to see to what the presenter 402 is discussing either as some of the data "blocks" may be obscured from her angle of view by other data blocks.

Figure 5:
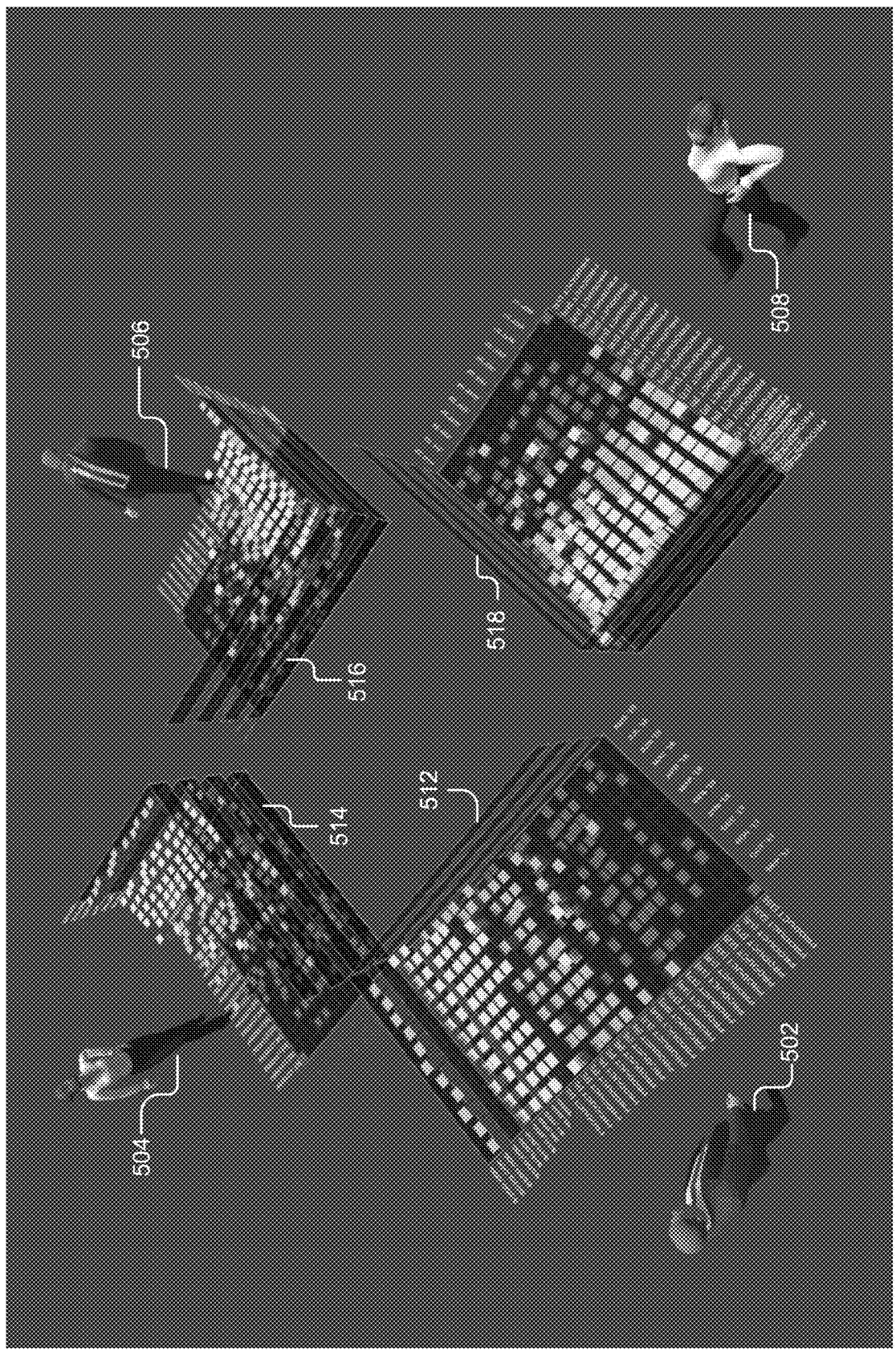
FIG. 5 illustrates that multiple users view their respective instances of a graphic from the same point of view as a presenter is viewing his/her graphic according to one embodiment.

Therefore, in one embodiment, the multi-user data presentation module 109 beneficially allows attendees to "see through the eyes" of the presenter in an AR/VR environment, which is described further with reference to FIGS. 3 and 5, and allows the presenter to show insights and build collective understanding with attendees.

Referring again to FIG. 3, in one embodiment, the multi-user data presentation module 109 comprises a collaboration module 322, a presenter module 324, an attendee module 326, and a spectator module 328. It should be recognized that the modules 322, 324, 326, 328, or subcomponents thereof, comprised in the multi-user data presentation module 109 are not necessarily all on the same computing device 106/122. In one embodiment, the modules 322, 324, 326, 328, and/or their functionality are distributed across multiple computing devices 106/122. For example, in one embodiment, the modules 322, 324, 326, 328, 330, 332 are distributed across multiple servers 122 or between client devices 106 and servers 122.

The collaboration module 322 includes code and routines for generating a collaboration environment. In one embodiment, the collaboration module 322 is a set of instructions executable by the processor 202. In another embodiment, the collaboration module 322 is stored in the memory 204 and is accessible and executable by the processor 202. In either embodiment, the collaboration module 322 is adapted for cooperation and communication with the processor 202, other components of the computing device 106/122 and other components of the multi-user data presentation module 109.

The collaboration module 322 generates a collaboration environment. Examples of collaboration environments may include a virtual meeting room, a virtual lecture hall, etc. Within or among the collaboration environments, there may be different configurations. For example, collaboration environments may include a different number of chairs around a table, different tables of different sizes or arrangements, different décor in the meeting room, different virtual setting (e.g. a room vs a field), etc.

Depending on the embodiment, the collaboration module 322 may allow a user to perform one or more of (1) develop a collaboration environment, (2) upload a collaboration environment (e.g. created using other tools or software), and (3) select a collaboration environment in which to have a meeting with other users.

When users join a collaboration environment they are assigned or may select a name and/or an avatar (e.g. while waiting in a virtual lobby). Depending on the embodiment, users are assigned or may select their initial position within the collaboration environment. For example, in one embodiment, a user may select in which chair, around a virtual conference table, the user would like the user's avatar to sit, as an initial position. In another example, in one embodiment, a user is assigned (e.g. based on role—presenter or attendee, order of arrival, seniority, user class, etc.) to a chair, as an initial position.

The presenter module 324 includes code and routines for receiving input from a presenter and sending the input for presentation to one or more attendees. In one embodiment, the presenter module 324 is a set of instructions executable by the processor 202. In another embodiment, the presenter module 324 is stored in the memory 204 and is accessible and executable by the processor 202. In either embodiment, the presenter module 324 is adapted for cooperation and communication with the processor 202, other components of the computing device 106/122 and other components of the multi-user data presentation module 109.

In one embodiment, the presenter module 324 obtains a graphic from a presenter as input. For example, in one embodiment, the presenter module 324 obtains an instance of the 3D chart illustrated in FIGS. 4 and 5 (i.e. an example graphic) from the presenter via the client device 106 and anchors the graphic to an initial position, scale, and orientation within the collaboration environment. The presenter module 324 sends the graphic for presentation to the attendee users via the attendee users' respective client devices 106.

In one embodiment, the presenter module 324 obtains interactions from a presenter as input from the presenter's client device 106. Depending on the embodiment and use case, the interactions may be one or more of an interaction with the graphic (e.g. a manipulation of the graphic), a user's interaction with respect to the collaboration environment (e.g. moving within the collaboration environment), and a user's interaction with a head mounted display (HMD) (e.g. a user panning or tilting his or her head while wearing a headset equipped with one or more gyroscopes). For example, in one embodiment, the presenter module 324 receives input from the presenter where the presenter rotates the graphic (i.e. an interaction with the graphic), pans or tilts his or her head (i.e. examples of HMD interaction), and uses a joystick to cause the presenter's avatar to walk around the graphic within the virtual collaboration environment (i.e. an interaction with the collaboration environment). In one such embodiment, the presenter module 324 makes those interactions available to the attendee module 326, so that the attendee module 326 may cause a presentation to the attendee users via the attendee users' client devices 106, so the attendees see what the presenting user sees.

The attendee module 326 includes code and routines for generating an attendee instance of the graphic, generating an anchor transform the attendee instance of the graphic, receiving presenter interactions, and applying a local transform to the attendee instance of the graphic. In one embodiment, the attendee module 326 is a set of instructions executable by the processor 202. In another embodiment, the attendee module 326 is stored in the memory 204 and is accessible and executable by the processor 202. In either embodiment, the attendee module 326 is adapted for cooperation and communication with the processor 202, other components of the computing device 106/122 and other components of the multi-user data presentation module 109.

In existing systems, multiple users view a common instance of a graphic. For example, referring again to FIG. 4, the users 402-408 are viewing a common instance of the illustrated chart. As users 402-408 are viewing a common instance of the graphic (i.e. the chart in the illustrated example), when the users 402-408 are arranged around the graphic, the users see the graphic from different angles.

In one embodiment, the attendee module 326 generates an individual instance of the graphic for each attendee. For example, in one embodiment, a first client device 106 (e.g. an Oculus GO) locally generates a first instance of a graphic being presented by a presenter for an attendee using the first device.

In one embodiment, the attendee module 326 generates an anchor transform so that an attendee's instance of the graphic is initially anchored in the virtual collaboration environment in the same way relative to that attendee's initial position (e.g. the user's chair in the meeting) that the presenter's graphic is anchored relative to the presenter's initial position in the virtual collaboration environment. For example, referring now to FIG. 5, assume that the presenter 502 is standing in his initial position in the collaboration environment, and that the graphic 512 is initially presented as illustrated (i.e. the graphic 512 is approximately centered left-to-right, the data values illustrated by the graphic 512 generally rise moving right-to-left, and the graphic 512 appears to be approximately 3 feet in front of the presenter 502.) In one embodiment, the client device 106 of user 504 generates an instance of the graphic (i.e. graphic 514) and generates a first anchor transform so that graphic 514 appears to attendee 504 to be approximately centered left-to-right, the data values illustrated by the graphic 514 generally rise moving right-to-left, and the graphic 514 appears (to attendee 504) to be approximately 3 feet in front of attendee 504. Similarly, the client device 106 associated with user avatar 506 generates an instance of the graphic (i.e. graphic 516) and generates a second anchor transform so that graphic 516 appears to attendee 506 to be approximately centered left-to-right, the data values illustrated by the graphic 516 generally rise moving right-to-left, and the graphic 516 appears (to attendee 506) to be approximately 3 feet in front of attendee 506, and the client device 106 associated with user avatar 508 generates an instance of the graphic (i.e. graphic 518) and generates a third anchor transform so that graphic 518 appears to attendee 508 to be approximately centered left-to-right, the data values illustrated by the graphic 518 generally rise moving right-to-left, and the graphic 518 appears (to attendee 508) to be approximately 3 feet in front of attendee 508.

While FIG. 5 illustrates four user avatars 502, 504, 506, 508 and four instances of the graphic 512, 514, 516, 518, in one embodiment, a user would not see the multiple instances of the graphic within the environment; rather, in such an embodiment, a presenter (502) or attendee (504, 506, or 508) would see a single instance (e.g. a single chart located in the middle of the four users) generated and manipulated for display to that particular user. To clarify, in one embodiment, a first user may see the environment of FIG. 4, where the first user's avatar is in the position of avatar 402 and sees a second user's avatar in the position of avatar 404, while the second user sees the environment of FIG. 4 from the position of avatar 402 and sees the first user's avatar in the position of avatar 408, and so on.

In one embodiment, the attendee module 326 obtains data from the presenter module 324 describing the presenter's interactions with the (presenter's instance of the) graphic. The attendee module 326 applies a local transform to the attendee's anchor transform based on the interaction data. As described above, the presenter interaction may include, but is not limited to, one or more of an interaction with the graphic, occasionally referred to herein as a graphic interaction, an interaction with the collaboration environment, and an HMD interaction.

In some embodiments, the attendee module 322 may obtain a presenter's interactions with the graphic responsive to the presenter using his or her client device's controls to manipulate (e.g. translate, rotate, or zoom) the graphic. For example, assume client device 106a is a VR headset associated with attendee 504, and that the presenter 502 rotated the graphic 512 clockwise; in one embodiment, an instance of the attendee module 326 on client device 106a receives data describing that interaction, occasionally referred to herein as interaction data.

In some embodiments, the attendee module 322 may obtain a presenter's interactions with the collaboration environment responsive to the presenter using his or her client device's controls to manipulate his or her avatar's position in the collaboration environment. For example, assume client device 106a is a VR headset associated with attendee 504, and that the presenter 502 walked around the graphic 512 in the virtual collaboration environment counter-clockwise; in one embodiment, an instance of the attendee module 326 on client device 106a obtains the associated interaction data.

In some embodiments, the attendee module 322 may obtain a presenter's interactions with the presenter's HMD. For example, assume client device 106a is a VR headset associated with attendee 504, and that the presenter 502, who is wearing a gyroscopically equipped HMD, panned or tilted his or her head; in one embodiment, an instance of the attendee module 326 on client device 106a obtains the associated interaction data.

In some embodiments, the attendee module 322 obtains the interaction data by receiving a message that is sent by the presenter module 324 responsive to the presenter module 324 obtaining the interaction by the presenter. In some embodiments, the attendee module 322 obtains interaction data based on an event, e.g., based on a trigger, satisfaction of a threshold, or satisfaction of a filter criteria.

The interaction data includes information about one or more of a translation, scaling, rotation, shear, and rotation of the presenter's graphic responsive to that interaction. For example, interaction data associated with an HMD interaction may include translational information, since the graphic translates within the presenter's field of view as the presenter pans or tilts his or her head. As another example, interaction data associated with an interaction with the collaboration environment may include a translation (e.g. as the presenter's avatar moved a bit closer to the graphic), a scaling (e.g. as the presenter's avatar moved closer to the graphic), and a rotation (e.g. as the presenter's avatar moved clockwise around the graphic as it moved closer to the graphic). As yet another example, interaction data associated with a graphic interaction may include a translation (e.g. as the moves the graphic a bit left), a scaling (e.g. as the presenter's zoomed out on the graphic), and a rotation (e.g. as the presenter also rotated the graphic).

In one embodiment, the attendee module 326 applies a local transform associated with a particular attendee, or client device of an attendee, to the instance of the graphic associated therewith based on the interaction data. For example, the attendee module 326 of client device 106a applies a first local transform, based on a first presenter interaction, to an anchor transform that is associated with an instance of the graphic on the client device 106a for display to the attendee (user 112a in this example) and applies a second local transform, based on a second presenter interaction, to the resulting local transform. Referring again to the example above, where the presenter 502 rotated the graphic 512 clockwise (or walked around the graphic 512 in the virtual collaboration environment counter-clockwise, in one embodiment, the attendee module 326 rotates an attendee's instance of the graphic clockwise, thereby maintain an identical point of view relative to the graphic.

As there are a number of ways to represent objects in 3D space, the interaction data and local transforms may vary based on the embodiment or one or more factors without departing from the scope of this disclosure. Examples of factors include, but are not limited to a coordinate system (e.g. cartesian, spherical, etc.), units (e.g. standard or metric, radians or degrees, etc.), representation (e.g. rotation matrix, Euler angle, Axis angle, quaternion, exponential map), etc.

Figure 6:
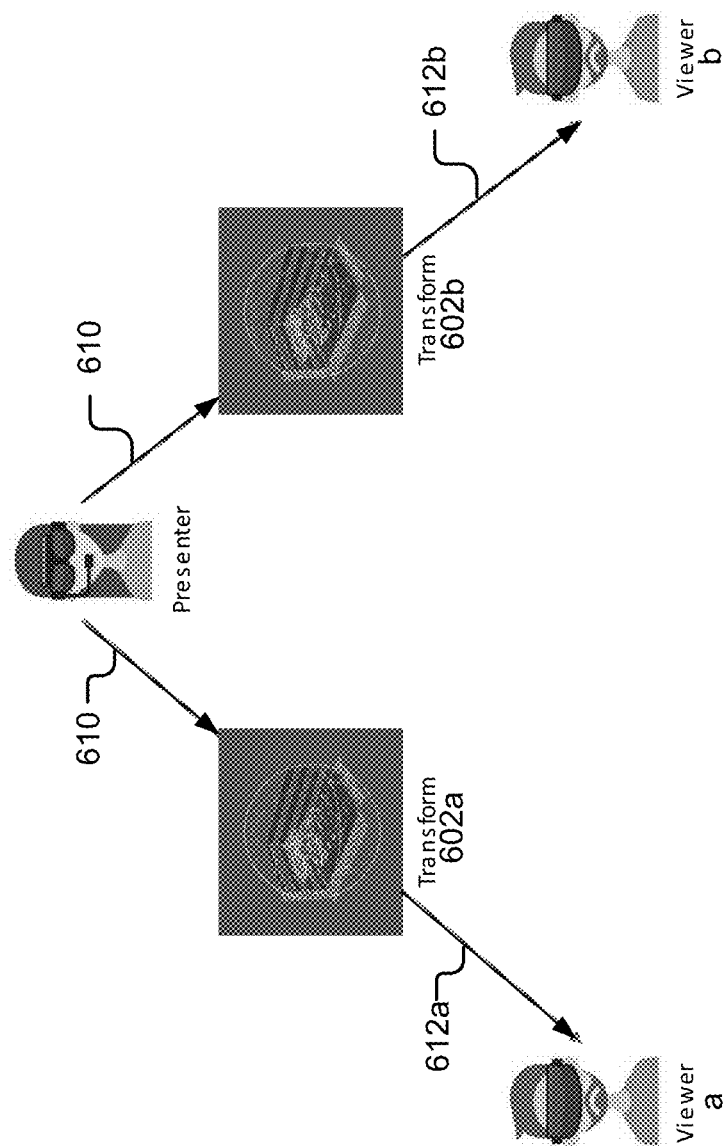
FIG. 6 is an illustration depicting application of a transform to presenter interactions so that attendees see their respective graphics as the presenter sees her graphic according to one embodiment

FIG. 6 is an illustration depicting application of a local transform to presenter interactions so that attendees (i.e. "viewers") see their respective graphics as the presenter sees her graphic according to one embodiment. Assume that the presenter has provided a graphic, such as the chart illustrated in FIGS. 4 and 5, for presentation, and the attendee module 326 has generated an instance of the graphic for each attendee (i.e. viewer a and viewer b), where each instance is positioned and oriented the same relative to the associated attendee as the presenter's instance of the graphic is to her. For example, in one embodiment, the attendee module 326 generates a first transform 602a (e.g. a first anchor transform that is a 3D affine transformation matrix, a 4×4 matrix including a 3×3 sub-matrix describing orientation in space and a 3×1 column sub-matrix describing position in space) and applies transform 602a to an instance of the graphic for viewer a, and generates a second transform 602b (e.g. a second anchor transform that is 3D affine transformation matrix) and applies transform 602b to an instance of the graphic for viewer b, thereby resulting in presentation of a common, initial view to the presenter and viewers a and b of their respective instance of the graphic. As the presenter interacts, the interaction data is provided, as illustrated by lines 610, for incorporation into the local transforms 602a and 602b of viewers a and b, respectively. In one embodiment, the interaction data provided at 610 may include the transformation performed on the presenter's instance of the graphic. For example, when the presenter's instance is translated, the associated translation matrix is concatenated by matrix multiplication to transform 602a before sending the updated presentation to viewer a as represented by line 612a, and concatenated by matrix multiplication to transform 602b before sending the updated presentation to viewer b as represented by line 612b. In such an embodiment, the presenter's interactions (whether a translation matrix, scaling matrix, rotation matrix/matrices, or shear matrix, and whether produced by interaction with the graphic, the collaboration environment, of the HMD) may be broadcast, or otherwise be obtained, and applied to the various local transforms as a series of matrix multiplications to present a common, view to the presenter and viewers a and b of their respective instance of the graphic.

In some collaboration environments, the presenter may control a pointer. It should be recognized that description herein may be adapted to apply a transform to the pointer so that the pointer presented to an attendee is consistent with instance of the pointer presented to an attendee.

As described above, the presenter's interactions may include, but are not limited to, one or more of an interaction with the graphic, an interaction with the collaboration environment, and an HMD interaction, and those interactions may cause the system 100 to modify the presentations to attendees so that the presenter and attendees view of their respective instances of the graphic is consistent. However, depending on the embodiment, or use case, one or more interactions with the graphic, interactions with the collaboration environment, or HMD interactions may not be applied to the local transform(s) by design or by user selection. For example, referring again to FIG. 3, in some embodiments, the presenter module 324 includes an interaction determiner 342.

The interaction determiner 342 includes code and routines for determining the set of presenter interaction types (e.g. one or more of graphic, environmental, and HMD) that are applied to the local transforms of attendees. In one embodiment, the interaction determiner 342 is a set of instructions executable by the processor 202. In another embodiment, the interaction determiner 342 is stored in the memory 204 and is accessible and executable by the processor 202. In either embodiment, the interaction determiner 342 is adapted for cooperation and communication with the processor 202, other components of the computing device 106/122 and other components of the multi-user data presentation module 109.

In some embodiments, the interaction determiner 342 receives input from a user that determines a set of interaction types to be applied to the local transforms of attendees of a collaboration. For example, the presenter may set a preference for a collaboration (or as a default) that only interactions with the graphic are to be applied to attendees' local transforms, so if the presenter (via her avatar) wanders away from the presenter's default/initial position or looks up from the graphic (e.g. while contemplating an answer to an attendee's question) those interactions do not affect the presentation of the graphic seen by attendees.

In some embodiments, the presenter interactions applied to the local transforms may be otherwise limited or modified. For example, referring again to FIG. 3, in some embodiments, the attendee module 326 includes an interaction filter module 352 and an interaction trigger module 354. However, in some embodiments, the interaction filter module 352 or the interaction trigger module 354, or portions thereof, may be included in the presenter module 324.

The interaction filter module 352 includes code and routines for filtering presenter interactions. In one embodiment, the interaction filter module 352 is a set of instructions executable by the processor 202. In another embodiment, the interaction filter module 352 is stored in the memory 204 and is accessible and executable by the processor 202. In either embodiment, the interaction filter module 352 is adapted for cooperation and communication with the processor 202, other components of the computing device 106/122 and other components of the multi-user data presentation module 109.

The interaction filter module 352 filters presenter interactions to prevent a subset of presenter interactions from being applied to local transform(s), effectively ignoring that subset of presenter interactions for the purposes of applying a local transform. In some embodiments, the filter includes one or more of a threshold and a rule. For clarity and convenience, consider HMD interactions; although, it should be recognized that HMD interactions are mere provided as one non-limiting example. Even when a presenter is standing still, there may still be some small amount of movement detected by the head mounted display. That movement, when captured and applied to the local transforms of attendees, may cause an attendee's graphic to shake or jitter. When the presenter speaks, or nods their head while listening to a question, those movements may cause an attendee's instance of the graphic to bounce when applied to a local transform. Therefore, in some embodiments, the interaction filter may apply one or more of a threshold and a rule. For example, the threshold may be associated with one or more of an amount (e.g. an amount of angular movement), a duration (e.g. how long is a presenter maintaining the change in position, rotation, or scale), or a rate (e.g. quickly is the presenter changing position, rotation or scale) so that the attendee module 326 only applies a subset of presenter interactions to the local transform(s). In another example, the rule may be associated presenter interactions not intended to modify the presentation (e.g. the rule may define interactions that are characteristic of head nodding, a presenter's resting/background movement, speaking, etc.). In some embodiment, the rules and thresholds may be derived through machine learning. In some embodiments, the rules or thresholds may be user modifiable. For example, an attendee may dial up the dampening of a presenter's interactions to reduce jitter if that user is particularly shaky.

The transformation trigger module 354 includes code and routines for determining a transformation trigger. In one embodiment, the transformation trigger module 354 is a set of instructions executable by the processor 202. In another embodiment, the transformation trigger module 354 is stored in the memory 204 and is accessible and executable by the processor 202. In either embodiment, the transformation trigger module 354 is adapted for cooperation and communication with the processor 202, other components of the computing device 106/122 and other components of the multi-user data presentation module 109.

In one embodiment, a transformation trigger is based on presenter input. For example, assume that the presenter's environmental and HMD interactions are not automatically applied to the local transforms on an ongoing basis (e.g. based on presenter preference via the interaction determiner 342). Therefore, the presenter may move around the graphic in the collaboration environment (rather than rotate the graphic) and attendees would no longer see what the presenter sees. When the presenter views something he or she wants the attendees to view, assume the presenter provides a predetermined input (e.g. clicks a particular button or combination of buttons). In one embodiment, the transformation trigger module 354 receives that predetermined input as a trigger, and recalculates the local transforms of attendees, so that attendees are presented what the presenter was presented at the time the trigger input was received.

In one embodiment, the attendee module 326 receives attendee interactions with the graphic and modifies the display based on those interactions. In one embodiment, when an attendee remains in the default position, the attendee "sees through the eyes of the presenter" and the attendees graphic is presented before the attendee as the presenter view his/her instance of the graphic. However, in some embodiments, an attendee is not limited to merely viewing the graphic as the presenter sees it. For example, in some embodiments, the attendee module 326 enables the user to move throughout the virtual collaboration environment to view the graphic from a point of view that differs from that of the presenter, receives those movements (or "interactions") and modifies the display of the attendees instance of the graphic accordingly.

In one such embodiment, the attendee module 326 maintains the point of view from the attendee's default position as what the presenter sees despite an attendee's movements or interactions. So, for example, if an attendee moves from his or her default position 30 degrees clockwise, and the presenter moves then 30 degrees counter-clockwise while the attendee remains still, the attendee's view point would be that which he/she had when he/she was at the default position. If the attendee then returned to his/her default position, he/she would again "see through the eyes of the presenter" (which would be a viewpoint 30 degrees counter-clockwise from the view he/she had when he/she left the default position—consistent with the presenter having moved 30 degrees counter-clockwise.

In one embodiment, the attendee module 326 allows an attendee to request to become a presenter. For example, an attendee may make the request by pressing the primary trigger on the VR device (i.e. a client device 106) controller.

In one embodiment, the current presenter is provided the option to grant or deny that request via the presenter module 324. In one embodiment, when the presenter switches, the attendees (including the former presenter) begin seeing what the new presenter sees.

The switch in presenter may or may not be immediate depending on the embodiment. In one embodiment, an attendee is required to return to his/her default position in the collaboration environment before becoming the presenter. Such an embodiment may facilitate continuity of visual presentation to the other users. For example, if a user were to deviate from his or her default position and then become a presenter, when the view of the attendee(s) synchs to that of the new presenters, there could be an abrupt jump or shift in the visualization, which could be disorienting.

The spectator module 328 includes code and routines for generating a spectator view. In one embodiment, the spectator module 328 is a set of instructions executable by the processor 202. In another embodiment, the spectator module 328 is stored in the memory 204 and is accessible and executable by the processor 202. In either embodiment, the spectator module 328 is adapted for cooperation and communication with the processor 202, other components of the computing device 106/122 and other components of the multi-user data presentation module 109.

In one embodiment, an attendee is a user 112 that has an AR or VR client device 106. For example, a client device 106 equipped with a stereoscopic display, and a spectator is a user 112, by contrast. that uses a client device 106 with a 2D display. In one such embodiment, the spectator module 328 provides a spectator view, allowing users without VR HMD device to join the collaboration—either physically or remotely—and see the experience on a 2D display like monitor or TV screen. In one such embodiment, a spectator may not request to be or be a presenter.

The multi-user data presentation module 109 further enables the users to interact and communicate via voice within the collaboration. Further, the multi-user data presentation module 109 represents users 112 attending a collaboration by Avatars, which may use simple human gestures—like hand wave, hand shaking, thumbs up and more—to express emotions and solidify the social-like experience.

Example Methods

Figure 7:
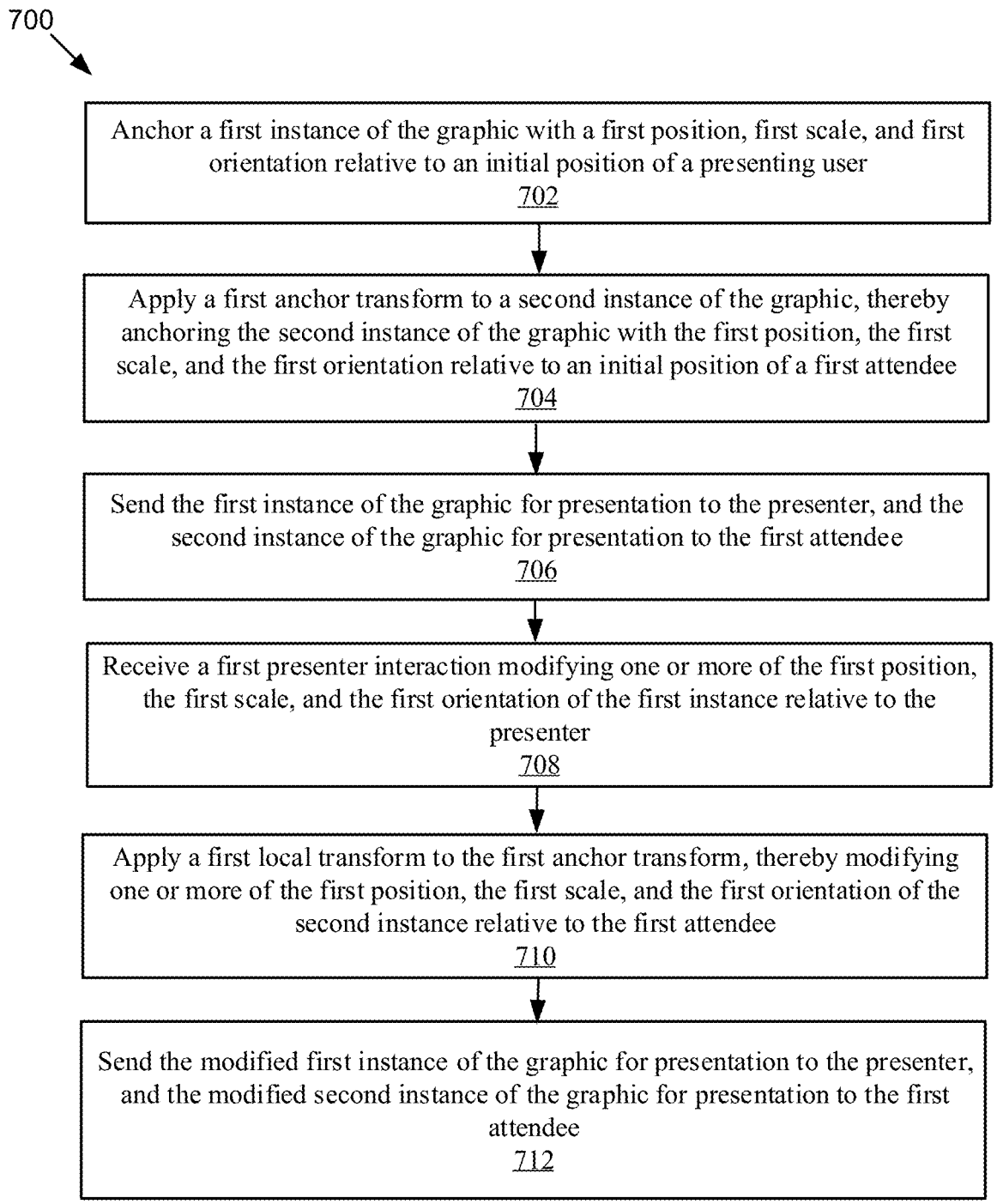
FIG. 7 is a flowchart of an example method for multi-user data presentation according to one embodiment.

FIG. 7 depicts method 700 performed by the system described above in reference to FIGS. 1-3 and 5. It should be recognized that this is merely one example and embodiments with different, more, or fewer steps are within the scope of this disclosure. For example, it should be recognized that at least some steps may be omitted or reordered and/or additional steps may be performed.

FIG. 7 illustrates a flowchart of an example method for multi-user data presentation according to one embodiment. The method 700 begins a block 702. At block 702, the presenter module 324, anchors a first instance of the graphic with a first position, first scale, and first orientation relative to an initial position of a presenting user. At block 704, the attendee module 326 applies a first anchor transform to a second instance of the graphic, thereby anchoring the second instance of the graphic with the first position, the first scale, and the first orientation relative to an initial position of a first attendee. At block 706, the presenter module 324 sends the first instance of the graphic for presentation to the presenter, and the attendee module 326 sends the second instance of the graphic for presentation to the first attendee. At block 708, the presenter module 324 receives a first presenter interaction modifying one or more of the first position, the first scale, and the first orientation of the first instance relative to the presenter. At block 710, the attendee module 326 applies a first local transform to the first anchor transform, thereby modifying one or more of the first position, the first scale, and the first orientation of the second instance relative to the first attendee. At block 712, the presenter module 324 sends the modified first instance of the graphic for presentation to the presenter, and the attendee module 326 sends the modified second instance of the graphic for presentation to the first attendee, and the method 700 ends.

Other Considerations

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the described purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc.

Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the method blocks. The structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
receiving, using one or more processors, a graphic,
anchoring, using the one or more processors, a first instance of the graphic in a collaboration environment with a first position, first scale, and first orientation relative to an initial position of a presenting user in the collaboration environment;
applying, using the one or more processors, a first anchor transform to a second instance of the graphic, the first anchor transform anchoring the second instance of the graphic in the collaboration environment with the first position, the first scale, and the first orientation relative to an initial position of a first attendee in the collaboration environment;
sending, using the one or more processors, the first instance of the graphic for presentation to the presenter, and the second instance of the graphic for presentation to the first attendee;
receiving, using the one or more processors, a first presenter interaction modifying the first instance, wherein the modified first instance includes a first modification to one or more of the first position, the first scale, and the first orientation relative to the presenter;
applying, using the one or more processors, a first local transform to the first anchor transform associated with the second instance, wherein applying the first local transform to the first anchor transform associated with the second instance includes concatenating the first local transform to the first anchor transform using matrix multiplication, wherein application of the first local transform modifies the second instance, wherein the modified second instance includes the first modification to one or more of the first position, the first scale, and the first orientation relative to the first attendee; and
sending, using the one or more processors, the modified first instance of the graphic for presentation to the presenter, and the modified second instance of the graphic for presentation to the first attendee.

2. The method of claim 1, further comprising:
receiving a second presenter interaction including a second modification to the first instance relative to the presenting user;
applying a second local transform to a result of the first local transform and the first anchor transform, wherein the application of the second local transform modifies the second instance to include the second modification relative to the first attendee; and
sending the modified first instance of the graphic for presentation to the presenter, and the modified second instance of the graphic for presentation to the first attendee.

3. The method of claim 2, wherein applying the second local transform to the result of the first local transform and the first anchor transform includes concatenating the second local transform to a product of the first anchor transform and first local transform using matrix multiplication.

4. The method of claim 1, further comprising:
applying a second anchor transform to a third instance of the graphic, the second anchor transform anchoring the third instance of the graphic in the collaboration environment with the first position, the first scale, and the first orientation relative to an initial position of a second attendee in the collaboration environment;
sending the third instance of the graphic for presentation to the second attendee;
applying a second local transform to the second anchor transform associated with the third instance, wherein application of the second local transform modifies the third instance, wherein the modified third instance includes the first modification to one or more of the first position, the first scale, and the first orientation relative to the second attendee; and
sending the modified third instance of the graphic for presentation to the second attendee.

5. The method of claim 1, wherein the first presenter interaction is an interaction with the first instance of the graphic.

6. The method of claim 1, wherein the first presenter interaction is an interaction with the collaboration environment.

7. The method of claim 1, wherein the first presenter interaction is an interaction with a head mounted display.

8. The method of claim 1, wherein presenter interactions include a first subset of presenter interactions responsive to which a local transform is applied to attendee instances of the graphic, and a second subset of presenter interactions ignored for purposes of local transformation application.

9. A system comprising:
one or more processors; and
a memory storing instructions that, when executed by the one or more processors, cause the system to:
receive a graphic,
anchor a first instance of the graphic in a collaboration environment with a first position, first scale, and first orientation relative to an initial position of a presenting user in the collaboration environment;
apply a first anchor transform to a second instance of the graphic, the first anchor transform anchoring the second instance of the graphic in the collaboration environment with the first position, the first scale, and the first orientation relative to an initial position of a first attendee in the collaboration environment;
send the first instance of the graphic for presentation to the presenter, and the second instance of the graphic for presentation to the first attendee;
receive a first presenter interaction modifying the first instance, wherein the modified first instance includes a first modification to one or more of the first position, the first scale, and the first orientation relative to the presenter;
apply a first local transform to the first anchor transform associated with the second instance, wherein applying the first local transform to the first anchor transform associated with the second instance includes concatenating the first local transform to the first anchor transform using matrix multiplication, wherein application of the first local transform modifies the second instance, wherein the modified second instance includes the first modification to one or more of the first position, the first scale, and the first orientation relative to the first attendee; and
send the modified first instance of the graphic for presentation to the presenter, and the modified second instance of the graphic for presentation to the first attendee.

10. The system of claim 9, wherein the system is further configured to:
receive a second presenter interaction including a second modification to the first instance relative to the presenting user;
apply a second local transform to a result of the first local transform and the first anchor transform, wherein the application of the second local transform modifies the second instance to include the second modification relative to the first attendee; and
send the modified first instance of the graphic for presentation to the presenter, and the modified second instance of the graphic for presentation to the first attendee.

11. The system of claim 10, wherein applying the second local transform to the result of the first local transform and the first anchor transform includes concatenating the second local transform to a product of the first anchor transform and first local transform using matrix multiplication.

12. The system of claim 9, wherein the system is further configured to:
apply a second anchor transform to a third instance of the graphic, the second anchor transform anchoring the third instance of the graphic in the collaboration environment with the first position, the first scale, and the first orientation relative to an initial position of a second attendee in the collaboration environment;
send the third instance of the graphic for presentation to the second attendee;
apply a second local transform to the second anchor transform associated with the third instance, wherein application of the second local transform modifies the third instance, wherein the modified third instance includes the first modification to one or more of the first position, the first scale, and the first orientation relative to the second attendee; and
send the modified third instance of the graphic for presentation to the second attendee.

13. The system of claim 9, wherein the first presenter interaction is an interaction with the first instance of the graphic.

14. The system of claim 9, wherein the first presenter interaction is an interaction with the collaboration environment.

15. The system of claim 9, wherein the first presenter interaction is an interaction with a head mounted display.

16. The system of claim 9, wherein presenter interactions include a first subset of presenter interactions responsive to which a local transform is applied to attendee instances of the graphic, and a second subset of presenter interactions ignored for purposes of local transformation application.

* * * * *